United States Patent
Hidaka et al.

(10) Patent No.: US 12,076,900 B2
(45) Date of Patent: Sep. 3, 2024

(54) RESIN MOLDED ARTICLE MANUFACTURING DEVICE, AND MANUFACTURING DEVICE CONTROL METHOD

(71) Applicant: NISSEI ASB MACHINE CO., LTD., Nagano (JP)

(72) Inventors: Yasuhiro Hidaka, Nagano (JP); Hiroki Ogihara, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 370 days.

(21) Appl. No.: 17/602,368

(22) PCT Filed: Apr. 8, 2020

(86) PCT No.: PCT/JP2020/015840
§ 371 (c)(1),
(2) Date: Oct. 8, 2021

(87) PCT Pub. No.: WO2020/209291
PCT Pub. Date: Oct. 15, 2020

(65) Prior Publication Data
US 2022/0168941 A1 Jun. 2, 2022

(30) Foreign Application Priority Data

Apr. 9, 2019 (JP) ................................ 2019-074092
May 28, 2019 (JP) ................................ 2019-099407

(51) Int. Cl.
*B29C 45/77* (2006.01)

(52) U.S. Cl.
CPC ...... *B29C 45/77* (2013.01); *B29C 2945/7601* (2013.01); *B29C 2945/76381* (2013.01);
(Continued)

(58) Field of Classification Search
CPC ............ B29C 47/77; B29C 2945/7601; B29C 2945/76381; B29C 2945/76859
See application file for complete search history.

(56) References Cited

U.S. PATENT DOCUMENTS

2002/0032500 A1    3/2002  Sasaki
2013/0123967 A1*   5/2013  Gruber .................... G06F 30/00
                                                            700/117
(Continued)

FOREIGN PATENT DOCUMENTS

CN       103158236 A      6/2013
DE       102017207586     11/2018
(Continued)

OTHER PUBLICATIONS

Extended European Search Report issued with respect to European patent application No. 20788375.2, dated Dec. 16, 2022, with an English translation thereof.
(Continued)

*Primary Examiner* — Mark A Connolly
(74) *Attorney, Agent, or Firm* — Greenblum & Bernstein, P.L.C.

(57) ABSTRACT

A manufacturing apparatus for manufacturing a resin molded article includes: an injection molding part configured to inject resin into an injection mold and injection-mold the resin molded article; a control unit configured to control the injection by the injection molding part; a calculation unit configured to calculate a pressure reduction curve for reducing a pressure generated by the injection; and an input unit via which a user inputs a condition of the pressure reduction curve, in which the control unit is configured to control the injection based on the pressure reduction curve.

2 Claims, 7 Drawing Sheets

(52) U.S. Cl.
CPC ............... *B29C 2945/76658* (2013.01); *B29C 2945/76859* (2013.01)

(56) References Cited

U.S. PATENT DOCUMENTS

| | | |
|---|---|---|
| 2013/0236589 A1 | 9/2013 | Yamaguchi et al. |
| 2014/0302191 A1 | 10/2014 | Yamaguchi et al. |
| 2015/0328817 A1 | 11/2015 | Yamaguchi et al. |

FOREIGN PATENT DOCUMENTS

| | | |
|---|---|---|
| JP | 5-3973 A | 1/1993 |
| JP | 10-113970 | 5/1998 |
| JP | 2002-86533 A | 3/2002 |
| JP | 2004-58571 A | 2/2004 |
| WO | 2012/057016 A1 | 5/2012 |

OTHER PUBLICATIONS

Office Action issued Jul. 28, 2023 in family member Chinese patent application No. 202080033900.X with English language translation thereof.

International Search Report issued in International Patent Application No. PCT/JP2020/015840, dated Jun. 30, 2020, along with an English translation thereof.

Written Opinion of the International Searching Authority issued in International Application No. PCT/JP2020/015840, dated Jun. 30, 2020.

Office Action issued in Corresponding CN Patent Application No. 202080033900.X, dated Mar. 27, 2024, along with an English translation thereof.

\* cited by examiner

RESIN MOLDED ARTICLE MANUFACTURING DEVICE, AND MANUFACTURING DEVICE CONTROL METHOD

TECHNICAL FIELD

The disclosure relates to a manufacturing apparatus for manufacturing a resin molded article and a control method for controlling the manufacturing apparatus.

BACKGROUND ART

Conventionally, a manufacturing apparatus for manufacturing a resin molded article and a control method for the manufacturing apparatus are known (e.g., see Patent Literature 1). In this type of manufacturing apparatus for manufacturing a resin molded article, in recent years, a new molding method has been proposed which can manufacture transparent and high-quality preforms or containers even when the injection molding time, especially, the cooling time is significantly reduced. Thereby, in an injection stretch blow molding apparatus that includes a preform temperature adjustment mechanism or a post-cooling mechanism and performs each process including an injection molding process, a temperature adjustment process, and a blow molding process at equal intervals, it has become possible to dramatically reduce the molding cycle time.

CITATION LIST

Patent Literature

Patent Literature: JP-A-H5-3973

SUMMARY OF INVENTION

Technical Problem

However, in the manufacturing apparatus for manufacturing a resin molded article by the above-mentioned conventional technique, the processing time of each process is shortened due to the shortening of the molding cycle time, and thus, there is a risk that the downstream process such as a blow molding process cannot be properly performed when the quality of the injection-molded preform is low. Therefore, it has become even more important to mold a high-quality preform in an injection molding process, which is the most upstream process.

Further, the injection molding process includes a filling process (injection process), a pressure holding process, and a cooling process. In the filling process, the moving speed of a screw or a plunger is controlled for each distance between an injection molding machine and each of a plurality of cavity molds. In the pressure holding process, the injection pressure is controlled in a plurality of steps in a stepwise manner at predetermined time intervals. Here, when switching between the filling process and the pressure holding process, pressure fluctuation accompanied by a sudden pressure drop occurs. This pressure fluctuation causes deterioration of the quality of the preform and molding defects. Especially in a manufacturing apparatus having a short molding cycle, the influence of this pressure fluctuation is not negligible. Similarly, since the injection pressure in the pressure holding process is controlled in a substantially stepwise manner, undesired pressure fluctuation occurs. Therefore, in order to stably perform the injection molding of preforms with a short molding cycle, it was necessary to improve the control method of the pressure holding process.

An object of the present disclosure is to provide a manufacturing apparatus for manufacturing a resin molded article and a control method for controlling the manufacturing apparatus, capable of stably manufacturing a resin molded article of good quality even with a short injection molding time.

Solution to Problem

The present disclosure provides a manufacturing apparatus for manufacturing a resin molded article, the manufacturing apparatus including: an injection molding part configured to inject resin into an injection mold and injection-mold the resin molded article; a control unit configured to control the injection by the injection molding part; a calculation unit configured to calculate a pressure reduction curve for reducing a pressure generated by the injection; and an input unit via which a user inputs a condition of the pressure reduction curve, in which the control unit is configured to control the injection based on the pressure reduction curve.

In this case, the input unit may be provided such that an order of the pressure reduction curve can be input thereto. The input unit may be provided such that a time length of the pressure reduction curve can be input thereto.

Further, the present disclosure provides a control method for controlling a manufacturing apparatus for manufacturing a resin molded article, in which the manufacturing apparatus includes: an injection molding part configured to inject resin into an injection mold and injection-mold the resin molded article; a control unit configured to control the injection by the injection molding part; a calculation unit configured to calculate a pressure reduction curve for reducing a pressure generated by the injection; and an input unit via which a user inputs a condition of the pressure reduction curve, the control method including: a step of calculating the pressure reduction curve based on the condition input to the input unit; and a step of controlling the injection based on the calculated pressure reduction curve.

In this case, the input unit may be provided such that an order of the pressure reduction curve can be input thereto. The input unit may be provided such that a time length of the pressure reduction curve can be input thereto.

Advantageous Effects of Invention

According to the present disclosure, it is possible to provide the manufacturing apparatus for manufacturing a resin molded article and the control method for controlling the manufacturing apparatus, capable of manufacturing a container of good quality even by a hot parison type blow molding method where a molding cycle time is shortened.

DESCRIPTION OF EMBODIMENTS

Hereinafter, preferred embodiments of the present disclosure will be described with reference to the drawings.

First Embodiment

Figure 1:
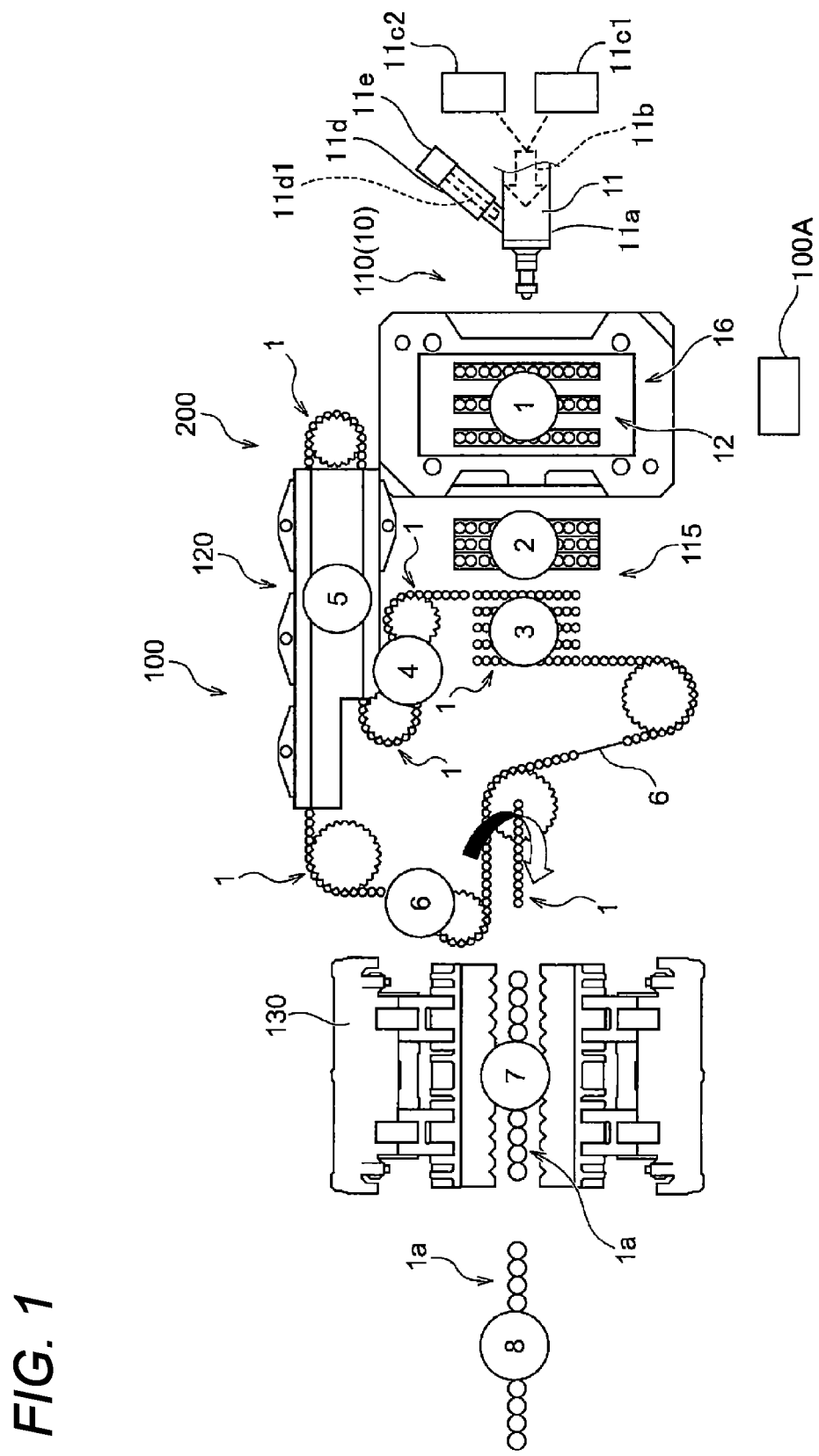
FIG. 1 shows a schematic view of a blow molding apparatus according to a first embodiment of the present disclosure.
Figure 2:
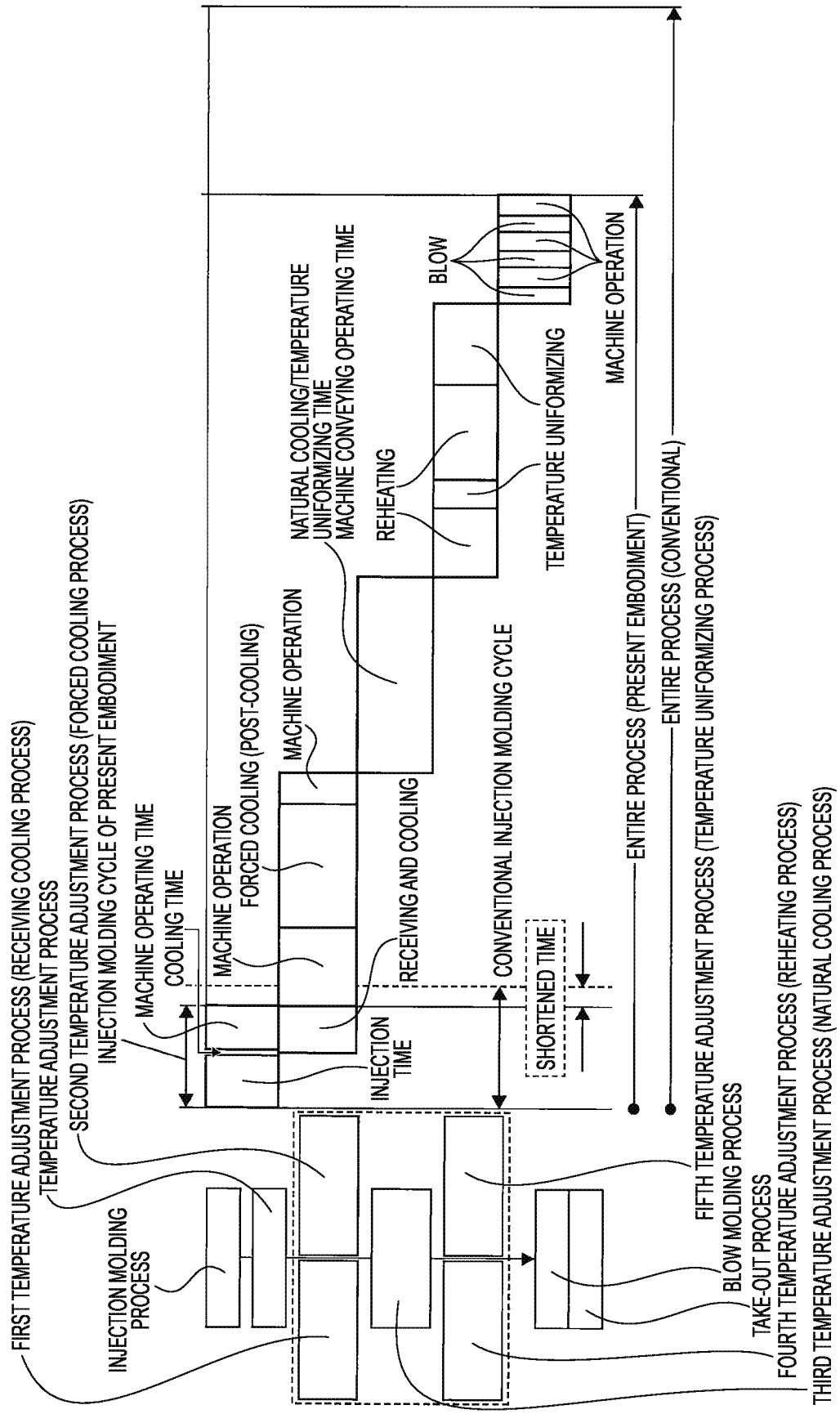
FIG. 2 shows a process diagram of the entire process.

FIG. 1 shows a schematic view of a blow molding apparatus according to a first embodiment of the present disclosure, and FIG. 2 shows a process diagram of the entire process.

In FIG. 1, process 1 indicates a preform molding process, process 2 indicates a preform post-cooling process, processes 3 and 4 indicate a preform temperature equilibrium process, process 5 indicates a reheating process, process 6 indicates a temperature uniformizing process, process 7 indicates a stretch blow molding process, and process 8 indicates a container take-out process.

As shown in FIG. 1, a blow molding apparatus (apparatus for manufacturing a resin container) 200 according to the present embodiment is configured so that a preform 1 is sequentially conveyed on a rail (conveyance path) 6 and subjected to each process by an injection molding station 110, a post-cooling station 115, a temperature adjustment station (heating part) 120, a stretch blow station (blow molding part) 130, and a take-out station. Thereby, the blow molding apparatus 200 is configured so that the cooling and the temperature adjustment are sequentially performed for the preform 1 being conveyed. Note that, the post-cooling station 115 is a station that is included in a part of the temperature adjustment station 120 in a broad sense and is particularly responsible for forced cooling of the preform 1.

The injection molding station 110 includes an injection device 11. The injection device 11 includes a heating cylinder 11a, a screw 11b arranged to be able to move by a stroke and rotate inside the heating cylinder 11a, a first screw drive unit 11c1 for rotating the screw, a second screw drive unit 11c2 for moving the screw 11b by a stroke, a pressure holding device 11d (a pressure holding cylinder in which a plunger 11d1 is incorporated to be able to move by a stroke), and a pressure holding device drive unit 11e.

The blow molding apparatus 200 is configured to perform blow molding for the preform 1 injection-molded in the injection molding station 110 a plurality of times without collectively performing the temperature adjustment and the blow molding at once. Specifically, for example, 36 preforms 1 are injection-molded at once in the injection molding station 110. However, for example, 12 preforms are conveyed at once to the temperature adjustment station 120 by the rail 6 and are temperature-adjusted therein, and then, for example, 12 preforms are blow-molded at once in the stretch blow station 130. Since the preform 1 injection-molded in the injection molding station 110 is cooled in the processes 2 to 4, heating is performed in the temperature adjustment station 120 by using an infrared lamp, after the post-cooling process. Note that, one molding cycle time of the blow molding apparatus 200 can be regarded as being substantially the same as the injection molding time of the preform 1. In addition, the number of blow moldings per one molding cycle time is preferably three, but is not limited thereto. Specifically, any number of blow moldings is possible as long as the injection-molded preforms of one batch are blow-molded a plurality of times.

The preform 1 injection-molded in the blow molding apparatus 200 is demolded from the injection molding station 110 in a soft state where the preform has heat amount of a higher temperature than the glass transition temperature of the synthetic resin material (for example, PET resin) (in a high temperature state where an outer shape of the preform can be maintained). Specifically, the blow molding apparatus 200 is configured to take out the preform 1 from the injection molding cavity mold of the injection molding station 110 before the outer surface temperature of the preform 1 molded in the injection molding station 110 becomes higher than the inner surface temperature thereof, and to cool the preform 1 in the preform post-cooling process of the process 2 and in the preform temperature equilibrium process of the processes 3 and 4 by equal to or higher than 10° C. and equal to or lower than 50° C. Thereby, the preform 1 accumulating heat from the injection molding is molded into a final container 1a in the stretch blow station 130 while utilizing the residual heat.

As shown in FIG. 2, the blow molding apparatus 200 shortens the preform molding cycle (injection molding cycle) by shortening the injection molding process and by the post-cooling function of using the temperature adjustment pot mold of the temperature adjustment process. At this time, in the injection molding station 110 in which the preform 1 is molded, the cooling time is set to ⅔ or shorter, ½ or shorter or ⅓ or shorter of the injection time (filling time), and is set preferably to be substantially 0 (zero) second.

In the below, each process is described.

First, as shown in FIG. 2, in the injection molding process, the blow molding apparatus 200 injects (fills) a material into a molding space of an injection molding mold set to 5° C. or higher and 20° C. or lower for a predetermined injection time, and completes the injection molding of the preform 1 after a predetermined short cooling time extremely close to 0 (zero) second. Then, the blow molding apparatus 200 takes out (demolds) the preform 1 from the injection molding station 110 into a receiving pot mold (not shown) over a predetermined machine operating time (process 1 of FIG. 1, the injection molding process of FIG. 2). For example, the injection time (filling time) is set to 3.0 seconds to 3.5 seconds, and the cooling time is set to 0.5 second to 1.0 second.

The machine operating time in the injection molding station 110 (FIG. 1) is a mold opening/closing time of the injection molding mold, and is a time for which the preform 1 is transferred from the injection molding mold to the receiving pot mold. The machine operating time is set to 3.5 seconds or more and 4.0 seconds or less, for example. When the preform 1 is taken out and conveyed by mechanical operations of an injection mold opening/closing mechanism (not shown) and the receiving pot mold, since the preform is cooled by contact with the ambient air and the receiving pot mold, the receiving and the forced cooling of the preform 1 are substantially combined in the temperature adjustment process (the first temperature adjustment process (receiving cooling process) in FIG. 2). At this time, the injection molding time (a sum of the injection time, the cooling time and the machine operating time) of the present embodiment is set to a time shorter than the injection molding time (conventional injection molding cycle) of the conventional art (e.g., WO 2012/057016 A).

When the receiving cooling process is performed, the blow molding apparatus 200 (FIG. 1) retreats the preform 1 from the injection molding station 110 while being received in the receiving pot mold and transfers the preform 1 to the temperature adjustment station 120 by a conveying member (not shown). By using the machine operating time, the temperature uniformizing treatment of the preform 1 is performed. At this time, the temperature of the outer layer (skin layer) of the preform 1 rises by 80° C. or more by the heat transfer from the inner layer (core layer), as compared to the temperature immediately after demolding from the injection molding station 110.

When the first temperature adjustment process is completed, the blow molding apparatus 200 performs the forced cooling process (post-cooling process) for the preform 1 carried into a temperature adjustment cavity mold 22 (cooling pot mold) of the temperature adjustment station 120, more specifically, the post-cooling station 115 (process 2 of FIG. 1, the second temperature adjustment process of FIG. 2 (forced cooling process)). The outer surface-side of the preform 1 comes into contact with the temperature adjustment cavity mold 22 set to the glass transition temperature of the material of the preform 1 or lower (for example, 60° C. or lower), and the preform 1 is forcibly cooled.

When the second temperature adjustment process is completed, the blow molding apparatus 200 (FIG. 1) transfers the preform 1 to the conveying member (not shown) standing by on the rail 6 by a machine operation such as inverting/lowering of the temperature adjustment cavity mold 22 (process 3 of FIG. 1). Then, the blow molding apparatus conveys the preform 1 to the temperature adjustment station 120 along the rail 6 together with the conveying member by an electric motor or a machine operation by a sprocket or the like (process 4 of FIG. 1). During the machine operation time (for example, 3.5 seconds or more and 4.0 seconds or less), the blow molding apparatus 200 naturally cools and temperature-uniformizes the preform 1 immediately after the post-cooling process is over until just before the reheating process starts in the temperature adjustment station 120 (the third temperature adjustment process of FIG. 2 (natural cooling process)).

When the preform 1 is cooled and temperature-uniformized in the third temperature adjustment process, the blow molding apparatus 200 performs heating and temperature uniformizing in order of reheating, temperature uniformizing, and reheating for the preform 1 in the reheating process (reheating station 120a) of the temperature adjustment station 120 (process 5 of FIG. 1, the fourth temperature adjustment process (reheating process) of FIG. 2).

When the preform 1 is heated and temperature-uniformized in order of reheating, temperature uniformizing, and reheating, the blow molding apparatus 200 temperature-uniformizes the preform 1 by conveying the preform along the rail 6 under atmosphere, and then carries the preform 1 into the blow molding station 130 (process 6 of FIG. 1, the fifth temperature adjustment process of FIG. 2 (temperature uniformizing process)). Immediately before the blow molding, the heat transfer is caused between the inner and outer layers (between the skin layer and the core layer) of the preform 1 or in the thickness direction of a body portion 2b, so that the temperature difference between the inner and outer layers is reduced and equilibrium stabilization of the temperature distribution of the preform 1 can be performed. Therefore, it is possible to optimize the temperature condition of the preform 1 immediately before the blow molding. Note that, the process time is set to about 1.0 seconds or more and 2.0 seconds or less, for example.

When the preform 1 is carried into the blow molding station 130, the blow molding apparatus 200 blow-molds the preform 1 to mold the container 1a in the blow process (process 7 of FIG. 1, the blow molding process of FIG. 2).

When the preform 1 is blow-molded to mold the container 1a, the blow molding apparatus 200 carries out and takes out the container 1a by a machine operation (process 8 of FIG. 1, acquisition process of FIG. 2). Note that, in the present embodiment, for the M (for example, 36) preforms 1 injected at once in the injection process, the temperature adjustment process, the natural cooling process, the reheating process and the blow process are performed for the N (12) preforms smaller than M each time. At this time, the temperature adjustment process, the natural cooling process, and the reheating process are continuously performed as the preforms 1 are conveyed along the rail 6. However, in the blow process, the blow molding is divided into three times and is each performed for the 12 preforms.

By the above processes, the time required for the entire process where the cycle by the blow molding apparatus 200 is shortened is shorter than the time required for the entire process by the conventional apparatus.

Figure 3:
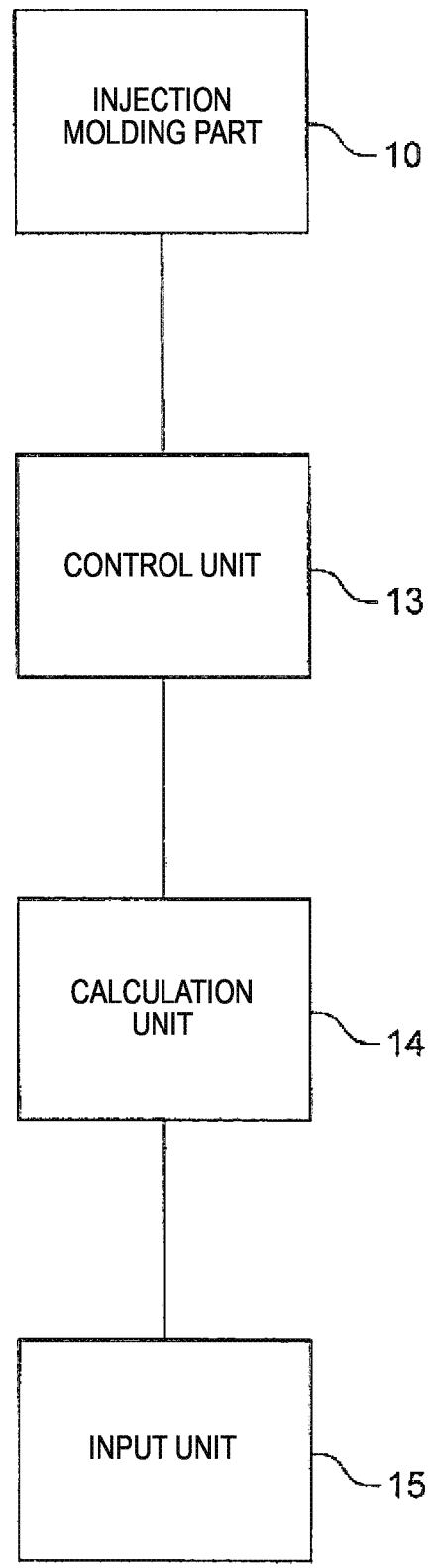
FIG. 3 shows a block diagram of the blow molding apparatus.
Figure 4:
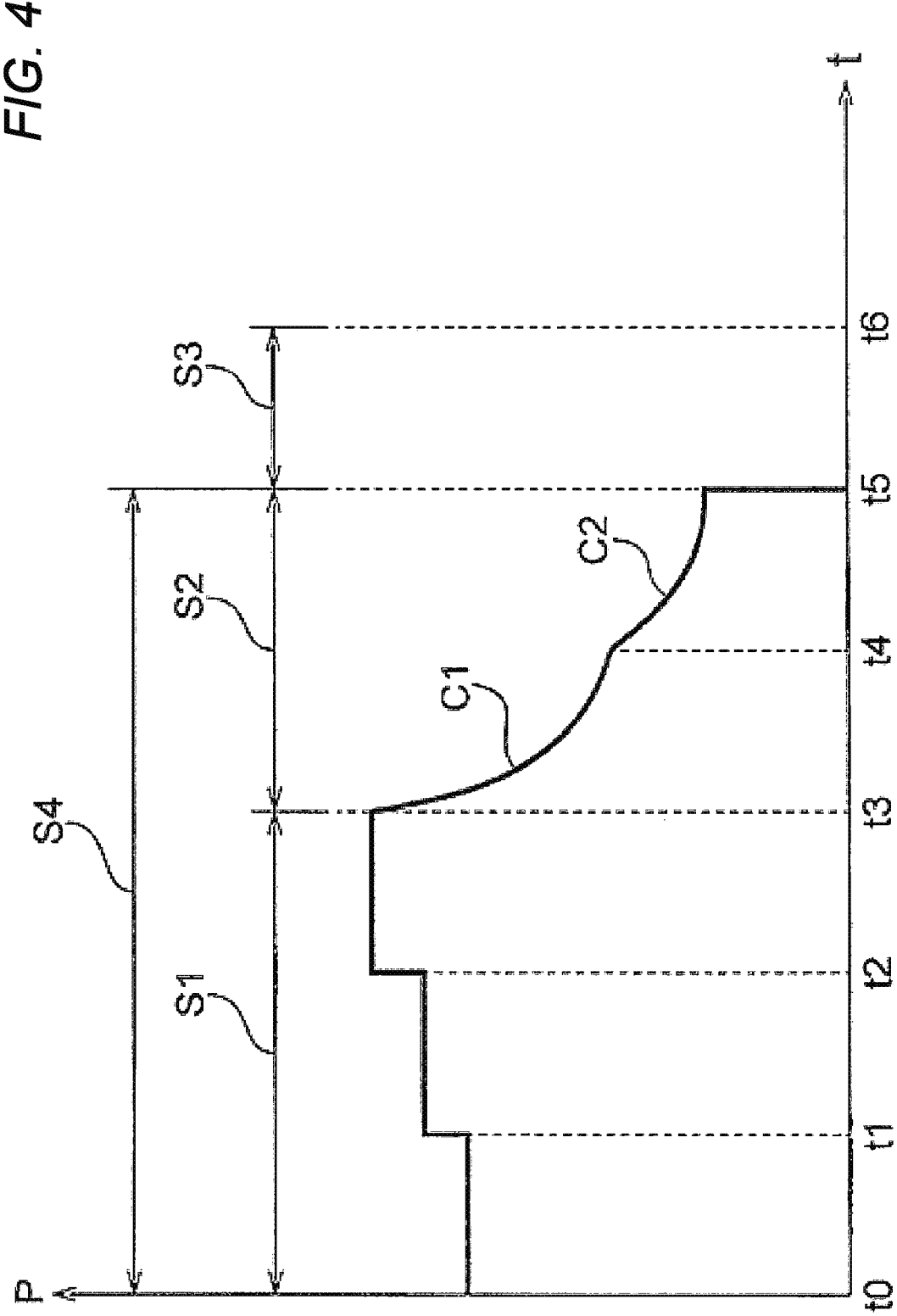
FIG. 4 shows a graph of fluctuations in injection pressure during an injection molding process.

FIG. 3 shows a block diagram of the blow molding apparatus, and FIG. 4 shows a graph of fluctuations in injection pressure during the injection molding process. In FIG. 4, the horizontal axis represents time and the vertical axis represents pressure.

As shown in FIG. 3, a blow molding apparatus 100 includes an injection molding part 10 (the injection molding station 110), a control unit 13, a calculation unit 14, and an input unit 15. Further, the injection molding part 10 includes the hydraulic injection device 11, an injection mold opening/closing device 16, and an injection mold 12. The injection mold opening/closing device 16 is responsible for a mold opening/closing operation and a mold clamping operation of the injection mold 12 (injection core mold and injection cavity mold) that forms a molding space (cavity) of the preform 1. Note that, the mold opening/closing direction of the injection mold opening/closing device 16 is preferably set in a vertical direction with respect to a machine base (upper and lower direction, a direction perpendicular to the paper plane in FIG. 1). Further, the injection device 11 includes the heating cylinder 11a, the screw 11b arranged to be able to move by a stroke and rotate inside the heating cylinder 11a, the first screw drive unit 11c1 for rotating the screw, the second screw drive unit 11c2 for moving the screw 11b by a stroke, the pressure holding device 11d (a pressure holding cylinder in which the plunger 11d1 is incorporated to be able to move by a stroke), and a pressure holding device drive unit 11e. Note that, a pressure holding process S2 (described later) may be performed by moving the screw 11b by a stroke instead of the pressure holding device. In this case, the second screw drive unit 11c2 also serves as the pressure holding device drive unit 11e.

As described above, in the injection molding part 10, the injection device 11 injects molten resin into the injection mold 12 in a state of being closed by the injection mold opening/closing device to injection-mold the preform 1 which is a resin molded article. The injection device 11 presses the supplied solid resin against an inner surface of the heating cylinder 11a by the rotation of the screw 11b and causes it to flow, thereby forming molten resin. Then, the injection device 11 retracts the screw 11b by a predetermined distance to measure the injection capacity of molten resin and advances the screw 11b by a predetermined distance to inject the molten resin into the injection mold 12.

The control unit 13 is a CPU that controls the injection of resin by the injection molding part 10 (see FIG. 1, more specifically, the injection device 11) in an injection process (filling process) S1 and the pressure holding process S2, which will be described later. In the pressure holding process S2, the control unit 13 acquires, from the calculation unit 14, a pressure holding curve data based on a pressure holding curve (pressure reduction curve) calculated by the calculation unit 14, and controls the injection of resin based on the acquired pressure holding curve data in the injection molding part 10.

The calculation unit 14 is an arithmetic unit that calculates a pressure holding curve for controlling (depressurizing, and the like) the pressure (pressure of molten resin in the injection mold 12) applied to the screw 11$b$, which is generated by the injection by the injection molding part 10 in the pressure holding process S2. The calculation unit 14 is configured to output the calculated pressure holding curve as the pressure holding curve data to the control unit 13.

The input unit 15 is an interface via which a user inputs conditions of the pressure holding curve, and the information input by the user is output to the calculation unit 14. In the present embodiment, a touch panel is used. The input unit 15 is provided such that an order of the pressure holding curve can be input thereto. For example, when a user inputs that the order of the pressure holding curve is quadratic, the calculation unit 14 calculates the pressure holding curve by a quadratic curve. Further, the input unit 15 is provided such that a time length of the pressure holding curve can be input thereto. Based on the time length input by the user, the calculation unit 14 determines a length for which the control unit 13 executes a control based on the calculated pressure holding curve. Note that, the order of the pressure holding curve does not have to be an integer, and may be a decimal such as 1.5, for example. The control unit 13, the calculation unit 14, and the input unit 15 are mounted on a controller device 100A and are connected to the blow molding apparatus 100.

As shown in FIG. 4, the injection molding process by the injection molding part 10 includes the filling process (injection process) S1, the pressure holding process S2, and a cooling process S3. In the filling process S1 corresponding to the time t0 to t3, the control unit 13 controls the moving speed of the screw or the plunger according to each distance between the injection device 11 (more specifically, the screw or the plunger) and each of a plurality of cavity molds, and fills (injects) molten resin into the injection cavity mold 12. Meanwhile, in the pressure holding process S2 corresponding to the time t3 to t5, the control unit 13 controls the injection pressure by the injection molding part 10 according to two pressure holding curves C1, C2 calculated based on the conditions input to the input unit 15 by a user. Further, in the cooling process S3 corresponding to the time t5 to t6, the control unit 13 controls the injection molding part 10 so that the injection pressure becomes 0 (zero). Specifically, the injection molding part 10 applies a pressure to the resin only during an injection process S4, which is a combination of the filling process S1 and the pressure holding process S2.

As can be seen from FIG. 4, in the filling process S1, the control unit 13 increases the injection pressure stepwise every predetermined time length (e.g., every same time). Further, in the pressure holding process S2, the control unit 13 reduces the pressure curvilinearly based on the pressure holding curves C1, C2 calculated by the calculation unit 14. Here, the amount of pressure reduction of the pressure holding curve C1 corresponding to the time t3 to t4 is set larger than that of the pressure holding curve C2 corresponding to the time t4 to t5.

Subsequently, the input image displayed on an LCD screen of the input unit 15 will be described.

Figure 5:
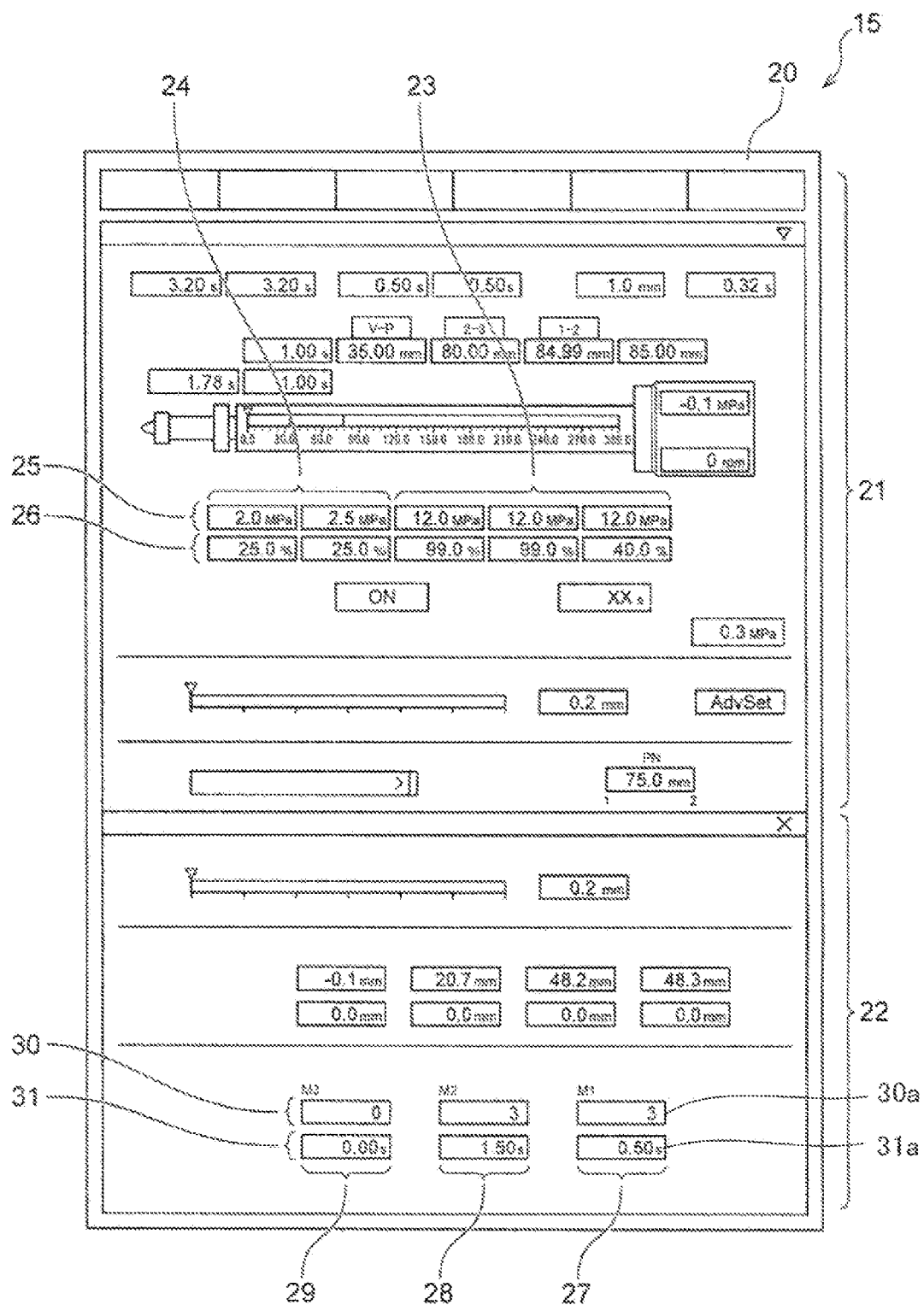
FIG. 5 shows an input screen displayed in an input unit.

FIG. 5 shows the input screen displayed in the input unit.

An LCD screen 20 of the input unit 15 roughly includes an injection condition area 21 via which a user inputs the conditions related to the injection of the injection molding part 10 and a pressure holding curve creation area 22 via which a user inputs the conditions of the pressure holding curve.

The injection condition area 21 has a filling condition setting display area (injection condition setting display area) 23 for setting and displaying an input value (setting value) of the conditions for causing an injection molding machine to execute the filling process S1, and a pressure holding condition setting display area 24 for setting and displaying an input value (setting value) of the conditions for causing an injection molding machine to execute the pressure holding process S2.

In each of the filling condition setting display area 23 and the pressure holding condition setting display area 24, setting pressures 25 of the screw 11$b$ and the plunger 11$d$1 corresponding to the pressure of hydraulic oil of a hydraulic pump of the second screw drive unit 11$c$2 and the pressure holding device drive unit 11$e$ are displayed in the upper stage, and setting speeds 26 of the screw 11$b$ and the plunger 11$d$1 corresponding to the pressure of hydraulic oil of the hydraulic pump of the second screw drive unit 11$c$2 and the pressure holding device drive unit 11$e$ are displayed in the lower stage. Note that, in FIG. 5, the first to third stages display respective pressure 25 and speed 26 set to correspond to the filling process S1, and the fourth and fifth stages display respective pressure 25 and speed 26 set to correspond to the pressure holding process S2. Specifically, in order from the right, the first stage displays the filling process S1 set to operate the injection molding machine at a pressure of 12.0 Mpa and at a speed of 40.0% (ratio to the flow rate of hydraulic oil at the rated time) of the rating (when the discharge amount of hydraulic oil by the hydraulic pump is maximum), the second stage displays the filling process S1 set to operate the injection molding machine at a pressure of 12.0 Mpa and at a speed of 99.0% of the rating, the third stage displays the filling process S1 set to operate the injection molding machine at a pressure of 12.0 Mpa and at a speed of 99.0% of the rating, the fourth stage displays the pressure holding process S2 set to operate the injection molding machine at a pressure of 2.5 Mpa and at a speed of 25.0% of the rating, and the fifth stage displays the pressure holding process S2 set to operate the injection molding machine at a pressure of 2.0 Mpa and at a speed of 25.0% of the rating. Note that, the hydraulic pump of the second screw drive unit 11$c$2 is provided for the purpose of moving the screw inside a hollow injection cylinder (heating cylinder), and the hydraulic pump of the screw drive unit 11$c$1 for the purpose of rotating the screw and melting and weighing resin between the screw and the injection cylinder is provided separately.

On the other hand, the pressure holding curve creation area 22 is, for example, a display screen for setting the pressure holding curves C1, C2 (see FIG. 4) and has the pressure holding curve used in the pressure holding process S2 as three-stage pressure holding conditions 27, 28, 29. Note that, the actual numerical values, etc. are input by a user using a keyboard or the like.

In each of the pressure holding conditions 27, 28, 29, an order setting display area 30 of each pressure holding curve is displayed in the upper stage, and a pressure holding time setting display area 31 to which the pressure holding curve of each step is applied is displayed in the lower stage. In FIG. 5, in the first pressure holding condition 27, "3" is input as an order 30$a$ and "0.50 S (sec)" is input as a pressure holding time 31*a*. In the second pressure holding condition 28, "3" is input as the order 30*a* and "1.50 S (sec)" is input as the pressure holding time 31*a*. In the third pressure holding condition 29, "0 (zero)" is input as the order 30*a* and "0 (zero) (sec)" is input as the pressure holding time 31*a*. That is, the conditions are input only to the first pressure holding condition 27 corresponding to the pressure holding curve C1 (see FIG. 4) and the second pressure holding condition 28 corresponding to the pressure holding curve C2 (see FIG. 4), and the pressure holding curve corresponding to the third pressure holding condition 29 is not calculated.

From the above, the conditions related to the pressure holding curve input by a user via the pressure holding curve creation area 22 are output to the calculation unit 14 as input data. When receiving the input data, the calculation unit 14 calculates the pressure holding curve and outputs it to the control unit 13 as the pressure holding curve data.

The blow molding apparatus 100 according to the present embodiment includes the injection molding part 10 configured to inject resin into the injection cavity mold 12 and injection-mold the preform 1, the control unit 13 configured to control the injection by the injection molding part 10, the calculation unit 14 configured to calculate the pressure holding curves C1, C2 for controlling the reduction of pressure generated by the injection in the pressure holding process S2, and the input unit 15 via which a user inputs the condition of the pressure holding curves C1, C2, in which the control unit 13 is configured to control the injection based on the pressure holding curve. Thereby, the injection pressure drops curvilinearly based on the pressure holding curve, and sudden pressure fluctuations do not occur. Therefore, even when the injection molding time is short, it is possible to stably manufacture a resin molded article of good quality.

Further, in the blow molding apparatus 100, since a user can input the conditions for calculating the pressure holding curve using the input unit 15, the injection pressure can be reduced based on the optimal pressure holding curve corresponding to the material, shape and size of the preform 1.

Second Embodiment

Figure 6:
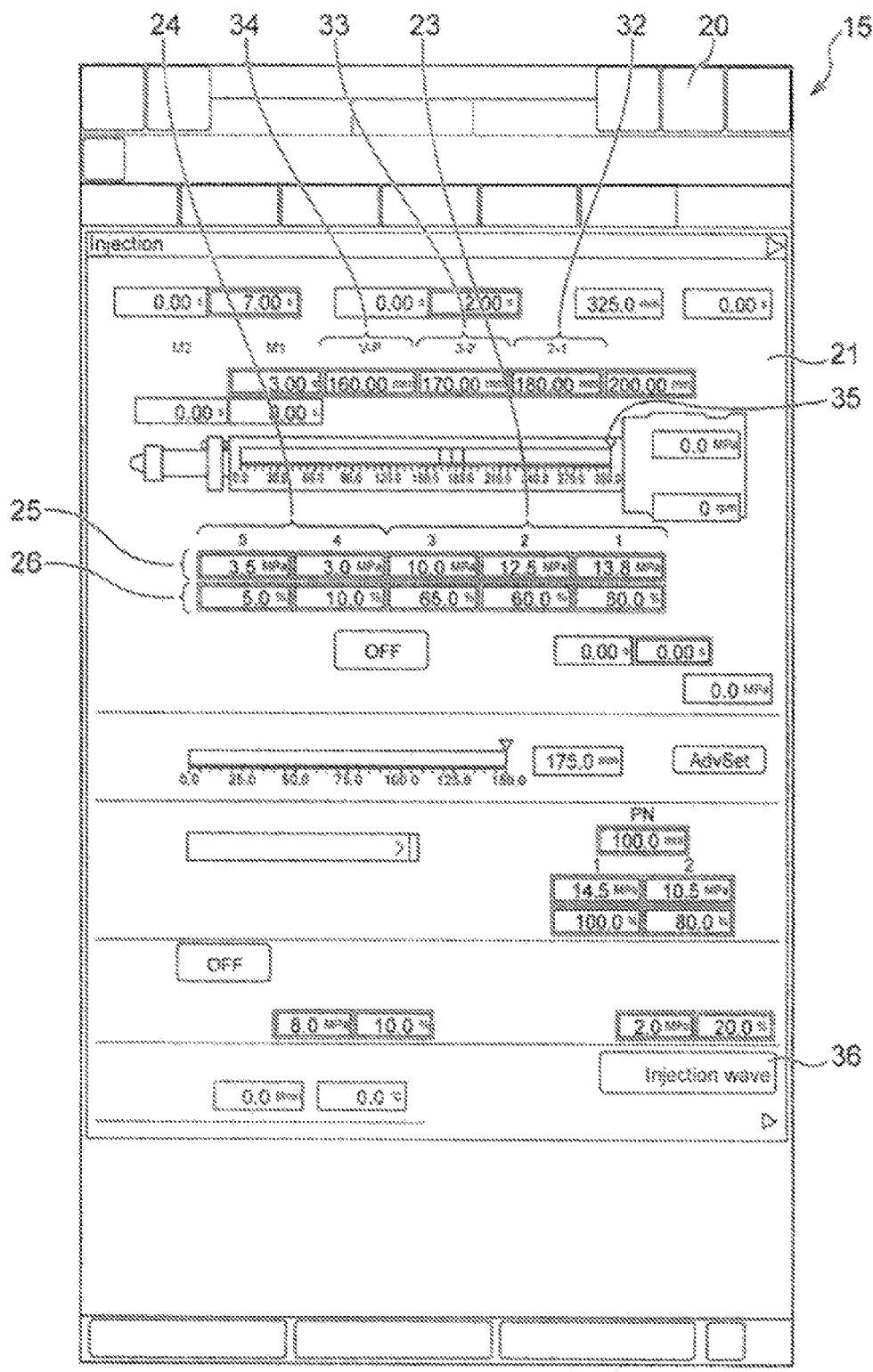
FIG. 6 shows an input screen displayed in an input unit according to a second embodiment.
Figure 7:
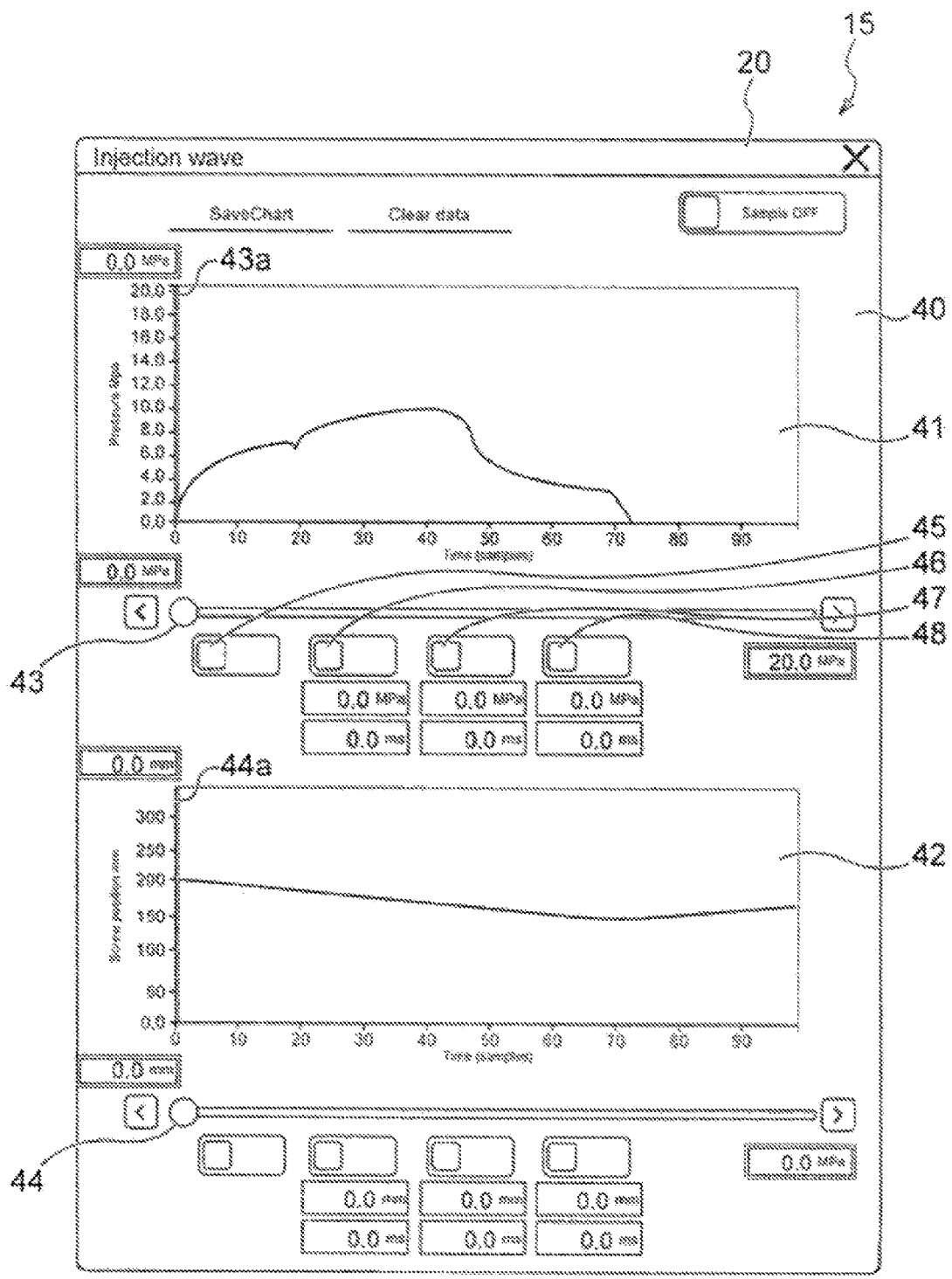
FIG. 7 shows a hydraulic pressure display screen displayed in the input unit according to the second embodiment.

FIG. 6 shows an input screen displayed in an input unit according to a second embodiment, and FIG. 7 shows a hydraulic pressure display screen displayed in the input unit according to the second embodiment. Note that, the parts of the second embodiment different from the first embodiment will be described, and the same reference numerals are used for substantially the same configurations as those in the first embodiment in the drawings.

As shown in FIG. 6, the input screen according to the present embodiment also has the filling condition setting display area (injection condition setting display area) 23 for displaying the input value (setting value) of the conditions to execute the filling process S1, the pressure holding condition setting display area 24 for displaying the input value (setting value) of the conditions for causing the injection molding machine to execute the pressure holding process S2, and condition switching position setting display areas 32, 33, 34 for setting the position of the screw at which each condition is to be switched. Note that, in this figure, an inverted triangular pointer 35 indicates the position of the screw.

The first condition switching position setting display area 32 displays the switching position between the first-stage injection condition and the second-stage injection condition of the filling process S1, which are input by using the input unit 15 (see FIG. 3). Specifically, when the screw reaches the position input in the first condition switching position setting display area 32, the operation condition is switched from the condition input in the first stage of the filling condition setting display area 23 to the condition input in the second stage of the filling condition setting display area 23. In the present embodiment, the filling process S1 is started from a position where the screw of the injection molding part 10 is 200.00 mm away from the tip of an injection cylinder (injection cylinder, heating cylinder, not shown). Therefore, from a position of 200.00 mm from the tip, the screw operates at a pressure of 13.8 MPa and at a speed of 80.0% of the rating, which are the first-stage conditions displayed in the filling condition setting display area 23. Here, 180.00 mm is displayed in the first condition switching position setting display area 32. Therefore, when the screw reaches the position of 180.00 mm from the tip, the operation conditions are switched so that the screw operates at a pressure of 12.5 MPa and at a speed of 60.0% of the rating, which are the second-stage conditions displayed in the filling condition setting display area 23.

The second condition switching position setting display area 33 displays the switching position between the second-stage injection condition and the third-stage injection condition, which are input by using the input unit 15. Specifically, when the screw reaches the position displayed in the second condition switching position setting display area 33, the operation condition is switched from the condition displayed in the second stage of the filling condition setting display area 23 to the condition displayed in the third stage of the filling condition setting display area 23. In the present embodiment, when the screw of the injection molding part 10 reaches the position of 170.00 mm from the tip, the operation conditions are switched so that the screw operates at a pressure of 10.0 MPa and at a speed of 65.0% of the rating, which are the third-stage conditions displayed in the filling condition setting display area 23.

The third condition switching position setting display area 34 displays the switching position between the third-stage injection condition and the fourth-stage injection condition (which is the pressure holding process S2), which are input by using the input unit 15. Specifically, when the screw reaches the position displayed in the third condition switching position setting display area 34, the operation condition is switched from the condition displayed in the third stage of the filling condition setting display area 23 to the condition displayed in the fourth stage which is the pressure holding condition setting display area 24. In the present embodiment, when the screw of the injection molding part 10 reaches the position of 160.00 mm from the tip, the operation conditions are switched so that the pressure holding device or the screw operates at a pressure 3.0 MPa and at a speed of 10.0% of the rating, which are the fourth-stage conditions displayed in the pressure holding condition setting display area 24.

In the present embodiment, a hydraulic pressure display screen switching button 36 is defined at a lower portion of the LCD screen 20. When a user presses the hydraulic pressure display screen switching button 36 by operating the input unit 15, the display on the LCD screen 20 is switched to hydraulic pressure display screen 40.

As shown in FIG. 7, the hydraulic pressure display screen 40 has a hydraulic pressure waveform graph area 41 and a screw position graph area 42.

In the hydraulic pressure waveform graph area 41, the horizontal axis represents time in milliseconds, and the vertical axis represents pressure in MPa. The graph displayed in the hydraulic pressure waveform graph area 41 represents a hydraulic pressure waveform based on the measured value of the pressure applied to the screw. The history of molten resin when the preform 1 (see FIG. 1) is injection-molded is gradually depicted according to the movement of the screw.

A move pointer 43 is provided below the hydraulic pressure waveform graph area 41, and a coordinate bar (coordinate cursor) 43a that moves corresponding to the move pointer 43 is displayed in the hydraulic pressure waveform graph area 41. Note that, in this figure, the move pointer 43 is located at the leftmost side, so that the coordinate bar 43a is displayed to overlap the vertical axis of the graph. When a user moves the move pointer 43 left and right by operating the input unit 15, the coordinate bar 43a moves left and right together with the move pointer 43.

An Old button 45, a Last button 46, an Act button 47, and a Best button 48 are defined below the move pointer 43.

The Old button 45 is a button for displaying the latest 50 hydraulic pressure waveforms in the hydraulic pressure waveform graph area 41 when pressed by the operation of the input unit 15.

The Last button 46 is a button for displaying the hydraulic pressure waveform of the injection molding performed last time in the hydraulic pressure waveform graph area 41 when pressed by the operation of the input unit 15.

The Act button 47 is a button for displaying the hydraulic pressure waveform of the injection molding currently being performed in the hydraulic pressure waveform graph area 41 when pressed by the operation of the input unit 15.

The Best button 48 is a button for displaying the hydraulic pressure waveform that the control unit 13 has determined to be optimal in the past in the hydraulic pressure waveform graph area 41 when pressed by the operation of the input unit 15. Here, the optimal is intended to mean that there is no sudden pressure change, that there is little pressure fluctuation, and that there is no behavior that causes the pressure to be peak.

In the screw position graph area 42, the horizontal axis represents time in milliseconds, and the vertical axis represents the position of the screw from the tip of the injection cylinder in mm. The graph displayed in the screw position graph area 42 represents a graph based on the measured value of the position of the screw. The graph is gradually depicted according to the movement of the screw when the preform 1 is injection-molded.

A move pointer 44 is provided below the screw position graph area 42, and a coordinate bar (coordinate cursor) 44a that moves corresponding to the move pointer 44 is displayed in the screw position graph area 42. Note that, in this figure, the move pointer 44 is located at the leftmost side, so that the coordinate bar 44a is displayed to overlap the vertical axis of the graph. When a user moves the move pointer 44 left and right by operating the input unit 15, the coordinate bar 44a also moves left and right together with the move pointer 44. Note that, the move pointer 43 of the hydraulic pressure waveform graph area 41 and the move pointer 44 of the screw position graph area 42 are linked to each other, so that when one of the move pointers 43, 44 is operated left and right, the other of the move pointers 43, 44 also moves left and right in the same manner.

The screw position graph area 42 has the same horizontal axis as the hydraulic pressure waveform graph area 41. Therefore, for example, when 20 milliseconds have lapsed from the start of injection molding, from the screw position graph area 42, it can be seen that the screw is located at a position of approximately 180 mm. At this time, from the hydraulic pressure waveform graph area 41, it can be seen that the actual pressure is about 7.0 MPa.

Further, for example, when 30 milliseconds have lapsed from the start of injection molding, the screw is located at a position of approximately 170 mm. At this time, from the hydraulic pressure waveform graph area 41, it can be seen that the actual pressure is about 9.5 MPa.

Furthermore, when 40 milliseconds have lapsed from the start of injection molding, the screw is located at a position of approximately 160 mm. At this time, from the hydraulic pressure waveform graph area 41, it can be seen that the actual pressure is about 10.0 MPa.

In the present embodiment, the hydraulic pressure waveform graph area 41 and the screw position graph area 42, which have the corresponding time axis, are provided. For example, as indicated by the hydraulic pressure waveform displayed in the hydraulic pressure waveform graph area 41, if a user discovers that there is a part where the pressure abnormally drops when 20 milliseconds have lapsed from the start of injection molding, a user can easily grasp that an abnormality has occurred at a position where the screw is about 180 mm by referring to the screw position graph area 42. Here, as shown in FIG. 6, since 180 mm is displayed in the first condition switching position setting display area 32, a user can easily determine that a first condition switching position, that is, the switching position between the first stage and the second stage of the filling process S1 is not appropriate. Thereby, a user can input, for example, 178 mm in the first condition switching position setting display area 32 by operating the input unit 15 and set the moving distance to be larger in the first-stage condition of the filling process S1 to eliminate the abnormal pressure drop.

In the present embodiment, the condition switching position setting display areas 32, 33, 34 in which the position for switching the filling condition can be input, and the hydraulic pressure waveform graph area 41 and the screw position graph area 42 which can be set and have the corresponding time axis, can be displayed on the LCD screen 20. Therefore, unnecessary pressure fluctuations such as pressure drop in the filling process S1 of the injection process can be easily suppressed, so that the molding quality and molding stability of the preform 1 can be improved.

Further, by performing the injection setting, the pressure holding setting, and the pressure holding curve setting, it becomes not necessary to unnecessarily lengthen the injection time, which contributes to shortening the molding cycle.

Although the present disclosure has been described above based on the embodiments, the present disclosure is not limited thereto. For example, although, in the present embodiment, the condition switching position setting display areas 32, 33, 34 are divided into three stages and the pressure holding condition setting display area 24 is divided into two stages, the present disclosure is not limited thereto.

| REFERENCE SIGNS LIST | |
|---|---|
| 1 | Preform (Resin molded article) |
| 1a | Container |
| 6 | Rail |
| 10 | Injection molding part |
| 12 | Injection cavity mold (injection mold) |
| 13 | Control unit |
| 14 | Calculation unit |
| 15 | Input unit |
| 20 | LCD screen |
| 21 | Injection condition area |
| 22 | Pressure holding curve creation area |

-continued

REFERENCE SIGNS LIST

| | |
|---|---|
| 23 | Filling condition setting display area |
| 24 | Pressure holding condition setting display area |
| 25 | Pressure setting display area |
| 26 | Speed setting display area |
| 27 | First pressure holding condition |
| 28 | Second pressure holding condition |
| 29 | Third pressure holding condition |
| 30 | Order setting display area |
| 31 | Pressure holding time setting display area |
| 32 | First condition switching position setting display area |
| 33 | Second condition switching position setting display area |
| 34 | Third condition switching position setting display area |
| 35 | Pointer |
| 36 | Hydraulic pressure display screen switching button |
| 40 | Hydraulic pressure display screen |
| 41 | Hydraulic pressure waveform graph area |
| 42 | Screw position graph area |
| 43 | Move pointer |
| 44 | Move pointer |
| 45 | Old button |
| 46 | Last button |
| 47 | Act button |
| 48 | Best button |
| 100 | Blow molding apparatus (apparatus for manufacturing resin molded article) |
| C1 | Pressure holding curve (pressure reduction curve) |
| C2 | Pressure holding curve (pressure reduction curve) |
| S1 | Filling process |
| S2 | Pressure holding process |
| S3 | Cooling process |
| S4 | Injection process |

The invention claimed is:

1. A manufacturing apparatus for manufacturing a resin molded article, the manufacturing apparatus comprising:
an injection molding part configured to inject resin into an injection mold and injection-mold the resin molded article;
a control unit configured to control the injection by the injection molding part;
a calculation unit configured to calculate a pressure reduction curve for reducing a pressure generated by the injection; and
an input unit via which a user inputs a condition of the pressure reduction curve,
wherein the control unit is configured to control the injection based on the pressure reduction curve, and
wherein the input unit is provided such that an order of the pressure reduction curve can be input thereto.

2. A manufacturing apparatus for manufacturing a resin molded article, the manufacturing apparatus comprising:
an injection molding part configured to inject resin into an injection mold and injection-mold the resin molded article;
a control unit configured to control the injection by the injection molding part;
a calculation unit configured to calculate a pressure reduction curve for reducing a pressure generated by the injection; and
an input unit via which a user inputs a condition of the pressure reduction curve,
wherein the control unit is configured to control the injection based on the pressure reduction curve, and
wherein the input unit is provided such that a time length of the pressure reduction curve can be input thereto.

* * * * *